July 17, 1956 — M. MAIER — 2,754,538
CASING FILLER AID FOR A SAUSAGE AND FOOD STUFFER
Filed April 29, 1953
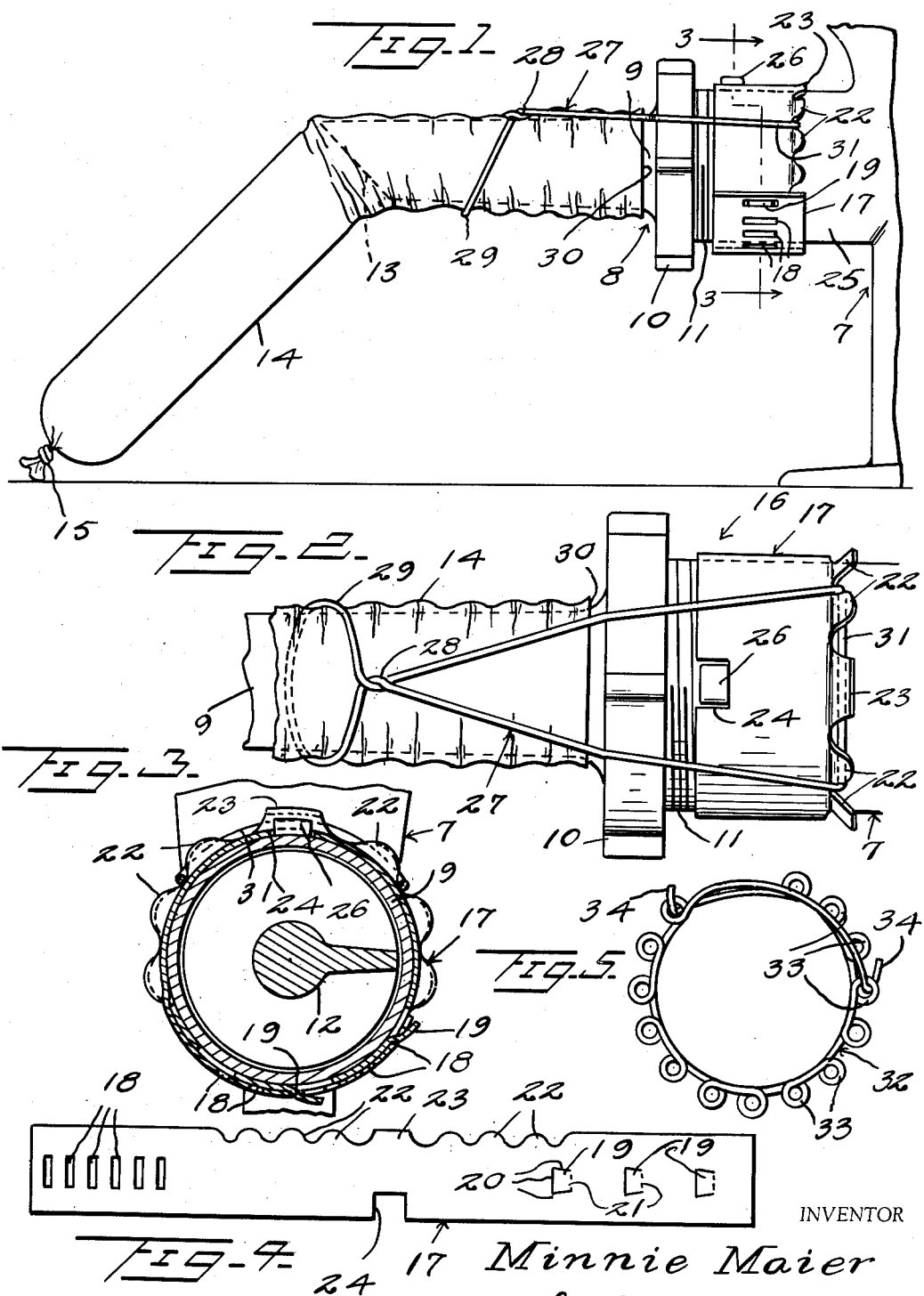
INVENTOR
Minnie Maier
BY John H. Randolph
ATTORNEY

United States Patent Office 2,754,538
Patented July 17, 1956

2,754,538

CASING FILLER AID FOR A SAUSAGE AND FOOD STUFFER

Minnie Maier, Valley City, N. Dak.

Application April 29, 1953, Serial No. 351,927

7 Claims. (Cl. 17—41)

This invention relates to a casing filling aid of extremely simple construction adapted for use with conventional meat cutting, grinding or mincing machines equipped with a mixing and stuffing attachment to which a casing is applied for stuffing the casing to form sausages or the like.

Ordinarily, such machines are hand operated by a crank requiring the use of one hand of the operator. The other hand is required to stuff the meat into the machine through its inlet or hopper. The pressure exerted by the machine in ejecting the ground meat or other food material therefrom into the casing tends to force the casing off of the filler tube so that a second person is required to manually hold the casing on the tube and allow it to move off gradually as the outer, closed end of the casing is filled with the food product.

Accordingly, it is a primary object of the present invention to provide an attachment of extremely simple construction which will eliminate the need for the second operator by effectively holding the casing on the tube and allowing the casing to slide outwardly of the tube as it is filled.

Another object of the invention is to provide a casing filler attachment of extremely simple construction capable of being quickly applied to or removed from the machine, which may be readily adjusted to fit machines of different sizes and to apply varying amounts of resistance to the displacement of the casing as it is being stuffed, off of the casing stuffing tube.

Various other objects and advantages of the invention will hereinafter become more fully apparent from the following description of the drawing, illustrating a presently preferred embodiment thereof, and wherein:

Figure 1 is a fragmentary side elevational view of a portion of a conventional meat grinding, cutting or mincing machine equipped with a conventional casing stuffer attachment to which the invention is shown applied;

Figure 2 is a top plan view on an enlarged scale of a portion of the machine and stuffer attachment with the invention shown applied thereto for yieldably retaining the casing thereon;

Figure 3 is an enlarged cross sectional view taken substantially along a plane as indicated by the line 3—3 of Figure 1;

Figure 4 is a plan view showing a part of the attachment in an extended position, and Figure 5 is a front or rear elevational view of a modified form of a part of the attachment.

Referring more specifically to the drawing, and first with reference to Figures 1 to 4, a portion of a conventional meat grinder, mincer or cutter is illustrated in the drawing and designated generally 7 and is shown equipped with a conventional casing stuffing attachment, designated generally 8, including an elongated tube 9 which is detachably mounted in registration with the outlet end of the machine 7 by a threaded collar or gland nut 10 which engages the externally threaded outlet end of the machine 7, designated 11. A conventional screw conveyor 12, forming a part of the machine 7, is rotatably disposed in the machine barrel and is suitably connected to a rotary driving mechanism of the machine 7. The outlet end 13 of the tube 9 is normally beveled on its underside, as indicated in dotted lines of Figure 1, to discharge outwardly and downwardly. A conventional tubular casing 14 is shown having an open end thereof applied over the tube 9 and the other end of the casing 14 which extends outwardly and downwardly from the discharge end 13 of the filling tube 9 is shown closed in a conventional manner as by a tie string 15. The parts previously described are of conventional construction and have been illustrated and briefly described merely to afford a better understanding of the casing filler aid, designated generally 16 and comprising the invention.

In the form of Figures 1 to 4, the casing filler aid comprises an anchoring member 17 in the form of an elongated relatively wide band which is preferably formed of a flexible or resilient sheet metal. Said anchoring member or band 17, as best illustrated in Figure 4, is provided adjacent one end thereof with a series of longitudinally spaced transversely elongated openings 18 and is provided adjacent its opposite end with a series of longitudinally spaced integral struck out tongues 19 each of which is cut from the band 17 along the lines 20 and is bent outwardly from the plane of the adjacent portion of the band along the dotted line 21. One longitudinal edge of the band 17 is scalloped to provide a plurality of lugs or prongs 22 and an intermediate lug or prong 23 which prongs 22 extend from nearly intermediate of the ends of the band and terminate in spaced relationship to the ends thereof. The other longitudinal edge of the band 17 is provided intermediate of its ends with a notch 24. The prongs 22 and 23 are bent outwardly at a slight angle from the plane of the band, as best illustrated in Figures 1 and 2.

The anchoring member or band 17 is wrapped around the barrel portion of the machine 7 inwardly of but adjacent its discharge end 11 with the prongs 22 and 23 located remote to said discharge end 11 and positioned around the upper half of the machine barrel. Said barrel 25 may be provided with an upstanding lug 26, as is conventional in some grinders, and where such is provided, the lug 26 is accommodated in the notch 24 and functions therewith to anchor the band 17 against rotation on the barrel 25 and to prevent the barrel from sliding toward the outlet end 11. Where such a lug is not provided, the outer or forward edge of the band in which said notch 24 is formed may be disposed against the inner side of the gland nut 10 which will then function as a stop therefore. The end of the band having the openings 18 is wrapped in overlapping relationship to the other end thereof and one of the tongues 19 is spaced outwardly through one of the openings 18 which is properly positioned to receive said tongue, as illustrated in Figure 3, for detachably anchoring the band around the barrel 25. In some instances, as illustrated in Figure 3, more than one of the tongues 19 may be passed through the openings 18 for more effectively connecting the ends of said band and it will be apparent that the anchoring member 17 is thus adapted to machine barrels 25 of different external diameters.

The casing filler aid also includes an endless elastic strand element 27, such as an elastic or rubber band, a portion of which engages around a part of the casing 14 which is disposed on the filler tube 9. The elastic element 27 is then twisted as indicated at 28 to form a loop 29 which engages around the casing 14 and the tube 9 at a point spaced from the open end 30 of the casing, which is located adjacent the gland nut 10. The twist 28 in the elastic element 27 is disposed above the tube 9 and forms a second larger loop 31 formed by the remainder of said elastic element and which engages behind and under one or more of the lugs or prongs 22 and 23, as clearly illustrated in Figures 1 and 2, for anchoring said elastic element 27 under tension to the band 17.

With the casing filling aid 16 thus applied, as illustrated in Figures 1 and 2, the machine 7 and its casing filling attachment 8 is operated in a conventional manner. The ground or minced food product, not shown, is extruded through the outlet end 13 of the tube 9 into the outer part of the casing 14 for initially filling the end thereof which is closed by the tie 15. The force of the extruded food material tends to displace the other end of the casing off of the tube 9; however, this tendency is resisted by the tensioned elastic element 27 until the portion of the casing disposed beyond the tube end 13 is substantially filled and packed with the food product. The force of the additional food material extruded through said discharge end 13 then commences to force the casing 14 off of said tube end to additionally tension the elastic element 27 which is stretched to enable this outward displacement of the casing 14 to occur and as the operation continues most of the remainder of the casing 14, shown in Figure 1 in engagement with the tube 9, is displaced therefrom and filled with the extruded food product. As this occurs, the loop 29 is drawn more tightly into engagement with the casing 14 to prevent it from slipping too freely therethrough and to prevent the casing from sliding too readily off of the tube 9. It will thus be seen that the attachment or aid 16 eliminates the need for a second operator to hold the open end of the casing on the filler tube 9 and to allow said end to be gradually displaced off of the tube, so that the filling of the casing 14 may be efficiently accomplished by one person manually operating the machine 7 with one hand and applying the food material thereto with the other hand.

Figure 5 illustrates a modified form of the anchoring member, designated generally 32, constituting an elongated band which is formed from a single strand of relatively heavy gauge wire provided throughout a substantial portion of its length with loops 33. The unlooped end portions of the strand are turned backward to form hooks 34. The strand forming the anchoring member 32 is wrapped around the barrel 25 with the loops 33 thereof projecting outwardly. The ends of the strand overlap and the hook portions 34 are engaged in certain of the loops 33 to adjustably anchor the member 32 around the barrel 25 either behind the lug 26 or behind the gland nut 10, either of which may function as a stop for the anchoring member 32. The loops 33 form lugs which function for the same purpose as the lugs 22 and 23 and to which the loop 31 of the anchoring member 27 is anchored.

Said loop 31 may engage different numbers of the lugs 22 and 23 or 33 to vary the tension of the elastic member 27, as desired.

Various other modifications and changes are contemplated and may obviously be resorted to, without departing from the spirit or scope of the invention as hereinafter defined by the appended claims.

I claim as my invention:

1. A casing filler aid of the character described comprising an elongated elastic strand member having a looped end engaging around a portion of a food product receiving casing and around a stuffing tube on which said portion of the casing is disposed, and means for anchoring another portion of said elastic member to a grinding machine to maintain the elastic member under tension for yieldably retaining the casing end on the stuffing tube.

2. A device as in claim 1, said elastic member being endless and having a twist therein forming the casing and tube engaging loop, said other portion of the elastic member comprising a second loop.

3. A device as in claim 2, said means comprising a band wrapped around a barrel portion of the machine and having overlapping ends, adjustable fastening means formed in said overlapping ends for securing the band around said barrel portion, and said band having a plurality of lugs formed in a longitudinal edge thereof located remote from the tube and casing and flared outwardly relatively to the band and barrel portion and under and behind which a part of said last mentioned loop of the elastic member is disposed.

4. A device as in claim 1, said anchoring means comprising a strand of relatively heavy gauge wire provided with a plurality of spaced loops and having turned back end portions forming hooks, said strand being wrapped around a barrel portion of the machine with the loops thereof extending outwardly therefrom and with the strand ends in overlapping relationship, said hooks engaging certain of said loops for adjustably securing the anchoring strand to the machine barrel, said last mentioned portion of said elastic member comprising a second loop selectively engaging certain of the outwardly projecting loops of said strand for anchoring the elastic member thereto.

5. A device as in claim 1, said means comprising a band wrapped around a barrel portion of the machine and having overlapping ends, adjustable fastening means formed in said overlapping ends for securing the band around said barrel portion, and said band having a plurality of lugs formed in a longitudinal edge thereof located remote from the tube and casing and flared outwardly relatively to the band and barrel portion and under and behind which a part of a second loop of the elastic member is disposed and anchored.

6. The combination with a meat comminuting machine having a casing stuffing attachment connected to the outlet thereof including a rigid tube on which an open end of a casing to be filled with the meat product is disposed, of a casing retaining means comprising an elongated elastic member having a loop engaging around a part of the casing portion disposed over the stuffer tube, and means detachably and adjustably anchoring another portion of said elastic member to the machine to maintain the elastic member under tension for causing said loop to frictionally grip said casing portion and to yieldably and frictionally resist displacement of said casing portion off of the stuffer tube.

7. A device as in claim 1, said means comprising an elongated member wrapped around a barrel portion of the machine and having overlapping ends, adjustable fastening means formed in said overlapping ends and selectively inter-engaged for securing said elongated member around said barrel portion, said elongated member having a plurality of circumferentially spaced integral outwardly projecting portions extending therefrom in a direction away from the barrel portion and to which a part of a second loop of said elastic member is connected and anchored.

References Cited in the file of this patent

UNITED STATES PATENTS

| | | |
|---|---|---|
| 658,521 | Atkinson | Sept. 25, 1900 |
| 872,294 | Hambruch | Nov. 26, 1907 |
| 2,168,693 | Walter | Aug. 8, 1939 |
| 2,279,237 | Kellems et al. | Apr. 7, 1942 |